United States Patent
Finneran

(10) Patent No.: US 6,193,064 B1
(45) Date of Patent: *Feb. 27, 2001

(54) MULTI-TIER VIAL PLATE

(75) Inventor: James G. Finneran, Vineland, NJ (US)

(73) Assignee: J. G. Finneran Associates, Inc., Vineland, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,009

(22) Filed: Nov. 4, 1998

(51) Int. Cl.[7] .............. B65D 85/20; B65D 1/36

(52) U.S. Cl. .......... 206/443; 134/84; 134/166 R; 206/562; 211/74; 220/507; 422/104

(58) Field of Search .................. 206/511, 512, 206/509, 594, 593, 443, 564, 562; 220/507, 23.6, 501, 571, 572; 134/169 R, 84, 166 R; 422/104; 211/74, 85.13, 62

(56) References Cited

U.S. PATENT DOCUMENTS

| Re. 34,133 | * | 11/1992 | Thorne | 220/23.6 X |
|---|---|---|---|---|
| D. 201,257 | * | 6/1965 | Vidal | 220/DIG. 15 X |
| 2,113,404 | * | 4/1938 | Hopwood | 217/19 X |
| 2,132,118 | * | 10/1938 | Lion et al. | 217/21 X |
| 2,623,670 | * | 12/1952 | More | 217/20 X |
| 3,034,679 | * | 5/1962 | Balfour et al. | 217/19 X |
| 3,184,095 | * | 5/1965 | Brandon et al. | 217/19 X |
| 3,306,463 | * | 2/1967 | Maslow | 220/516 X |
| 3,593,873 | * | 7/1971 | Vonk | 220/507 |
| 3,802,592 | * | 4/1974 | Wheaton, III | 220/516 X |
| 4,501,360 | * | 2/1985 | Levy et al. | 206/443 |
| 4,588,095 | * | 5/1986 | Mehra | 211/74 |
| 4,597,503 | * | 7/1986 | Lates | 220/516 X |
| 4,664,283 | * | 5/1987 | Liu | 206/509 X |
| 5,016,771 | | 5/1991 | Finneran . | |
| 5,096,672 | * | 3/1992 | Tervamaki et al. | 422/102 |
| 5,248,035 | * | 9/1993 | Gallagher | 206/511 X |
| 5,330,053 | * | 7/1994 | Tabuchi et al. | 206/455 |
| 5,346,677 | * | 9/1994 | Risk | 422/297 |
| 5,456,360 | * | 10/1995 | Griffin | 206/443 |
| 5,544,751 | * | 8/1996 | Klodt et al. | 206/509 |
| 5,622,676 | * | 4/1997 | Lind | 206/443 X |
| 5,670,268 | * | 9/1997 | Mancusi | 220/507 X |
| 5,789,251 | * | 8/1998 | Astle | 436/48 |
| 5,882,603 | * | 3/1999 | Taggart | 422/104 |
| 5,993,745 | * | 11/1999 | Laska | 422/104 |

FOREIGN PATENT DOCUMENTS

2395780 * 3/1979 (FR) ................... 422/104

OTHER PUBLICATIONS

Industrial Plastics Theory and Applications, Terry Richardson, p. 79, Dec. 1997.*

VWR Scientific Products, "Nunc–Immuno PolySorp Plates, Nunc," p. 960, 1998.

VWR Scientific Products, "MicroWell Plates, Nunc," p. 958, 1998.

Perfector Scientific, "Perfector Plasticware, 96 well microplate and covers" Spring 1998, p. 15.

(List continued on next page.)

Primary Examiner—Allan N. Shoap
Assistant Examiner—Joe Merek
(74) Attorney, Agent, or Firm—Ratner & Prestia

(57) ABSTRACT

A vial plate includes a base plate having protrusions spaced from each other to form compartments for supporting vials and openings which allow the flow of liquids or gases to heat or cool the vials. The vial plate may have a cover and use a multi-tiered structure having one or more spacers which attach to the base plate, each other, or the cover to vary the height of the vial plate for accommodating vials of different sizes. The vial plate does not float in water, can accommodate vials containing volatile solvents, and can support individual vials.

11 Claims, 7 Drawing Sheets

OTHER PUBLICATIONS

Biomedical Products, "Whatman 96–Well Filter Plates," Jun. 1998, vol. 23, No. 6, p. 16.

Biomedical Products, "The Cliniplate 384 Microplate," Jun. 1998, vol. 23, No. 6, p. 19.

Biomedical Products, "1 ml and 2ml and 2 ml Deep Well Blocks," Jun. 1998, vol. 23, No. 6, p. 43.

Biomedical Products, "384 Well Plates," Jun. 1998, vol. 23, No. 6, p. 43.

LC•GC, "Liquid–handling System," vol. 16, No. 6, Jun. 1998, p. 591.

Pharmaceutical Laboratory, "Microlute Offers Versatility and Superior Performance," vol. 1. No. 2, Apr. 1998, p. 15.

Pharmaceutical Laboratory, "Micro–Assay Plate," vol. 1, No. 2, Apr. 1998, p. 32.

Pharmaceutical Laboratory, "Extract Samples Faster Than Bees", Advertising: 3M Empore High Performance Extraction Disk Plate, vol. 1, No. 2, Apr. 1998, p. 35.

Pharmaceutical Laboratory, "Join the Greiner America, Inc. Family", Advertising the following products: 96 Well Microplate, 384 Well Microplate, and 1536 Well Microplate, vol. 1, No. 2, Apr. 1998, p. 49.

* cited by examiner

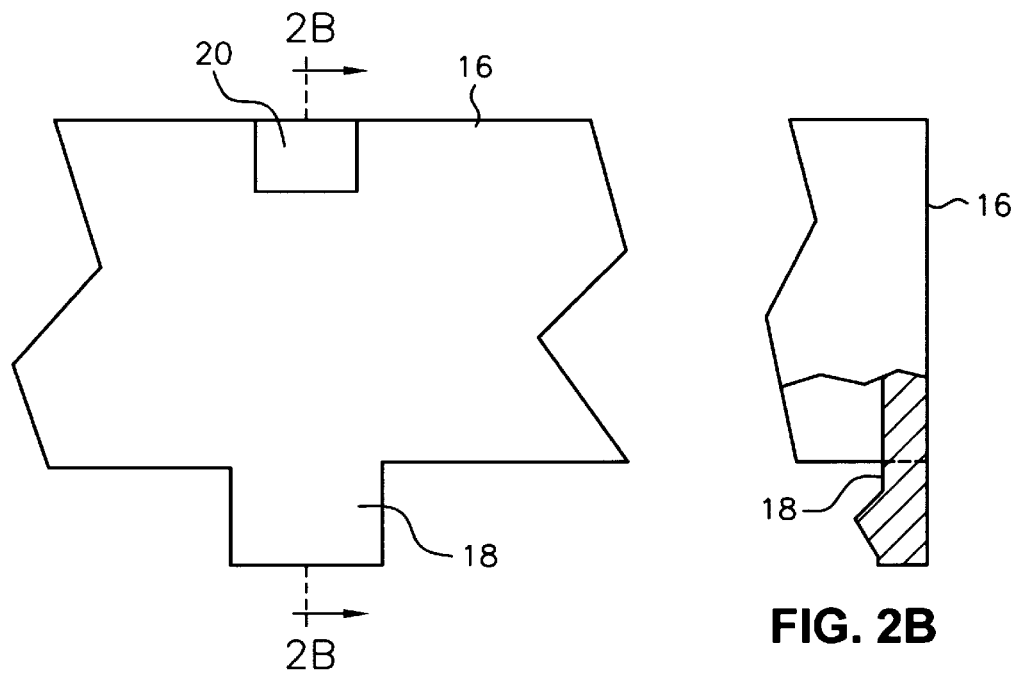
FIG. 2A
FIG. 2B
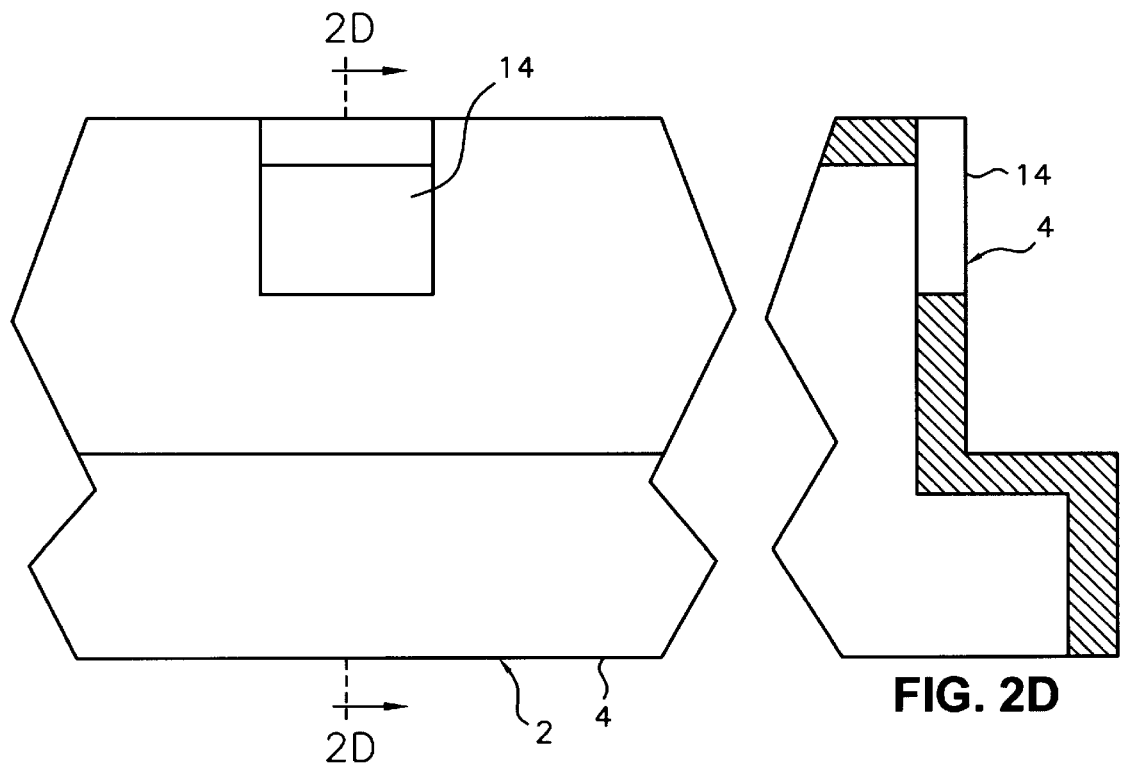
FIG. 2C
FIG. 2D

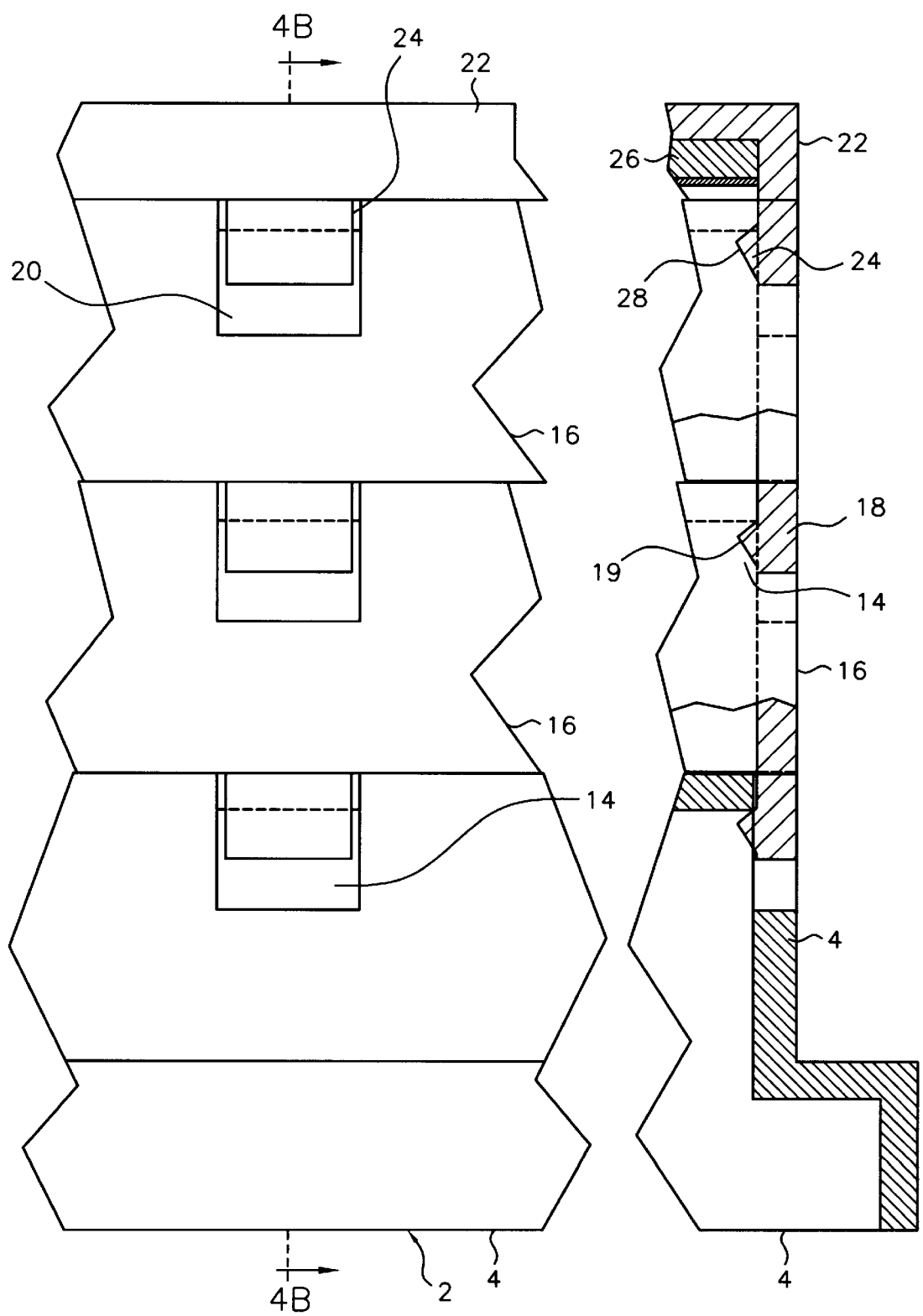
FIG. 4A  FIG. 4B

MULTI-TIER VIAL PLATE

TECHNICAL FIELD

The present invention relates generally to devices used in analytical chemistry assays and, more particularly, to plates for holding vials used in analytical chemistry assays.

BACKGROUND OF THE INVENTION

Analytical chemistry laboratories use a variety of different sized and shaped vials for different types of experimental assays, including sorbent assays, high-throughput screening assays, and combinatorial chemistry analysis. In those assays, there is a need to provide support for the vials used. Often, the support is necessary to maintain the vials in an upright position to facilitate chemical reactions, prevent assay fluids from escaping from the vials, enable movement of the vials without disturbing the assay, or meet other experimental considerations. Various vial-holding devices, such as microplates, have been used for assays performed in these laboratories, optionally used in autosamplers. Generally, these devices contain multiple compartments for insertion of and providing support for vials.

Moreover, certain conventional devices will not allow for insertion and support of individual vials, but will only properly support a series of connected vials for microassays. In instances when less than a series of vials are to be used in an assay, these devices prevent the use of the assay or require that the whole series of vials be used, thus, wasting the unused vials of the series.

Generally, vials used in analytical chemistry assays are made of glass or plastic, among other suitable materials. Many of the assays performed in analytical chemistry laboratories require heating or cooling of the vials to simulate in vitro conditions or temperature sensitive experiments, or mimic in vivo conditions. The heating or cooling is usually done using liquids or gases. Often, to heat or cool the vials, the exterior of each vial is immersed in fluids (liquids or gases) having various temperatures, such as in a hot water bath. Some of the conventional vial-holding devices float in water so that they are unstable in a water bath and require the use of other instruments to stabilize them. This requirement can significantly affect the conditions under which an assay is to be performed or it may render useless the results of an assay.

Also, in many assays, uniform heating or cooling of all of the sample vials is desired. Many conventional vial-holding devices do not allow direct contact of all of the vials with the heating or cooling medium, thus preventing uniform changes in temperature within the vials. In addition, many of the conventional devices do not allow for use with volatile solvents because these solvents attack the vial holders.

Devices commonly used for holding vials include blocks, boxes, deep well plates, and microplates, such as well plates and microtiter plates, some of which may use covers. These microplates are generally used for antibody assays, such as ELISA, and can hold 96 or 384 vials or other multiples of, for example, 96. Many of the conventional microplates or vial holders contain specifically shaped compartments which do not allow for insertion of certain types of vials.

Deep well plates are usually made of polypropylene and retro-fitted with glass vials. These plates are often translucent and used in high-throughput drug screening and combinatorial chemistry analysis. Nevertheless, these plates cannot be used with certain volatile solvents.

Thus, there is a need for a vial-holding device which can accommodate individual vials of different shapes and sizes, be used with volatile solvents, maintain its position at the bottom of a water bath, and allow uniform transfer of heat to and from the vials.

SUMMARY OF THE INVENTION

To meet this and other needs, and in view of its purposes, the present invention provides a vial plate for holding vials. The plate of the present invention can have varying heights. It can have a fixed height or it can be multi-tiered for adjustable height to support different sized vials. The plate of the present invention can contain a cover for the vials.

A preferred embodiment for the plate of the present invention contains a base plate for holding certain sized vials and spacers that attach to the base plate to increase its height for support of tall vials. The plate of the present invention is constructed of an inert material having a density such that the plate does not float in aqueous liquids. In addition, the vial plate, in combination with a cover having a resilient liner, can accommodate volatile solvents. The vial plate of the present invention contains openings which allow for the flow of thermal energy through the bottom of the base plate.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 2A is an exploded side view of the spacer of the present invention;

FIG. 2B is an exploded side view of the spacer through section 2B—2B of FIG. 2A;

FIG. 2C is an exploded side view of the base plate;

FIG. 2D is an exploded side view of the base plate through section 2D—2D of FIG. 2C;

FIG. 4A is an exploded side view of the cover, two spacers, and base plate attached using slots and tabs;

FIG. 4B is an exploded side view of the cover, two spacers, and base plate attached using slots and tabs through section 4B—4B of FIG. 4A;

DETAILED DESCRIPTION OF THE INVENTION

The vial plate of the present invention can support a variety of sized vials by adjusting its height, optionally using a multi-tiered structure. The vial plate can have a fixed height or can use spacers for an adjustable height. The vial plate can accommodate vials of different size, shape, and material and can handle volatile solvents. In addition, the vial plate can support individual vials and can accommodate differing amounts of vials used in different assays.

Figure 1A:
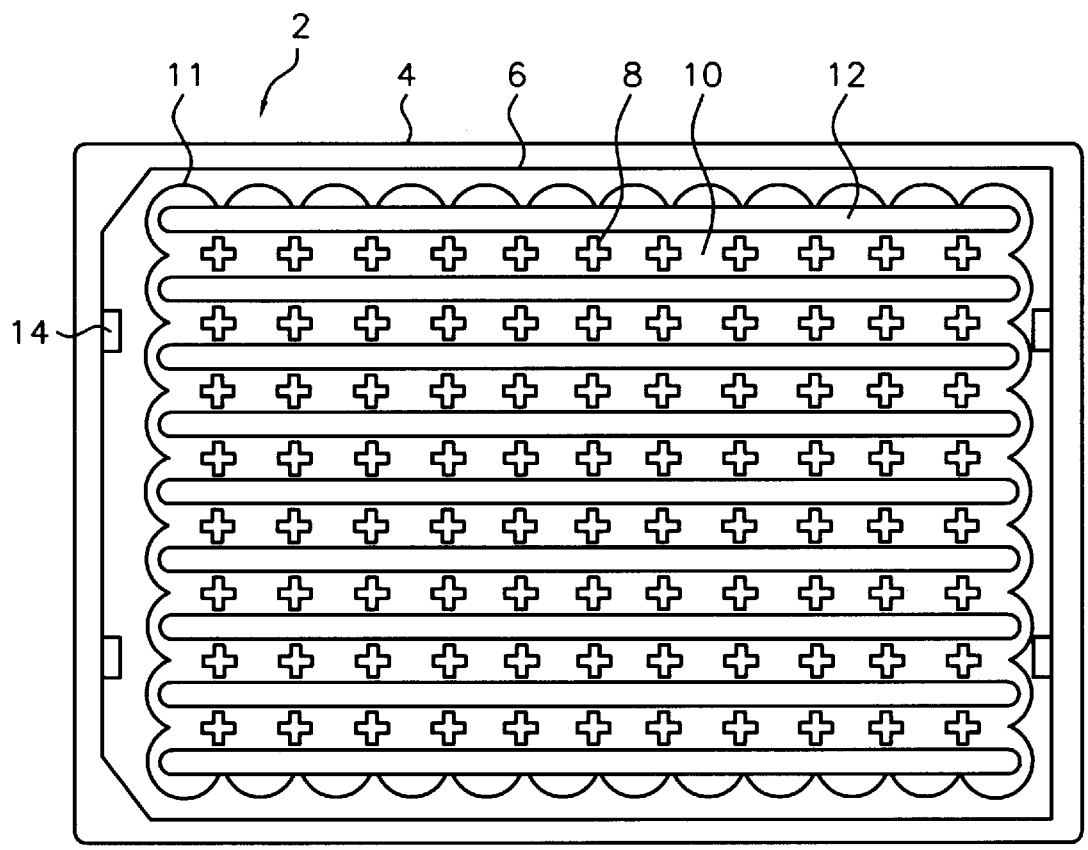
FIG. 1A is a top view of the base plate of the present invention.
Figure 1B:
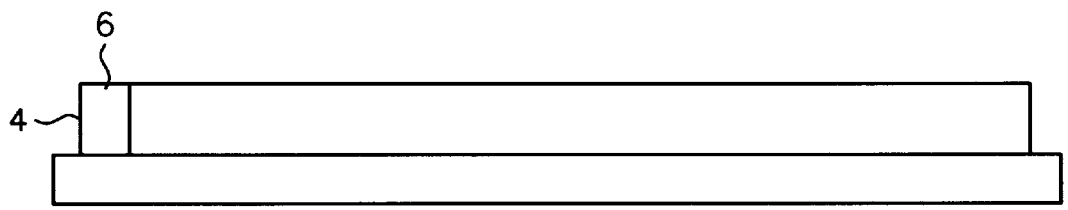
FIG. 1B is a side view of the base plate shown in FIG. 1A.

As shown in FIG. 1A, the vial plate 2 includes a base plate 4 having a solid perimeter portion 6 and many protrusions 8 inside of the perimeter portion 6 which form compartments 10 to hold the vials. These compartments 10 allow the base plate 4 to hold one or more individual vials without the need for a series of vials attached to each other. The protrusions 8 may be shaped so that they conform around vials inserted into the compartments 10. Although not a necessity, the compartments 10 may have scalloped ends 11 where the compartments 10 contact the perimeter 6 of the base plate 4. Scalloped ends 11 accommodate round vials.

In addition, the base plate 4 has openings 12 on its underside to accommodate the flow of thermal energy (hot or cold) from gases or liquids. The openings 12 in the base plate 4 cover at least a part of every vial compartment 10. Openings 12 may be in the form of channels running parallel to each other along the length, the width, or both the length and the width of the base plate 4 or the channels may intersect each other, such as in a criss-cross or perpendicular pattern. The openings 12 allow the liquids from the assay to contact the vials, not only the vial plate 2. In addition, openings 12 allow the even flow of thermal energy through the base plate 4 to the vials so that the vials may be uniformly heated or cooled. The base plate 4 is made of plastic, such as a chemically resistant polypropylene, or any other suitable inert material having similar properties, including a density greater than that of water. This density prevents the base plate 4 from floating in a water bath or in other aqueous solutions. Further, the material is inert so that it can handle volatile liquids.

Figure 7A:
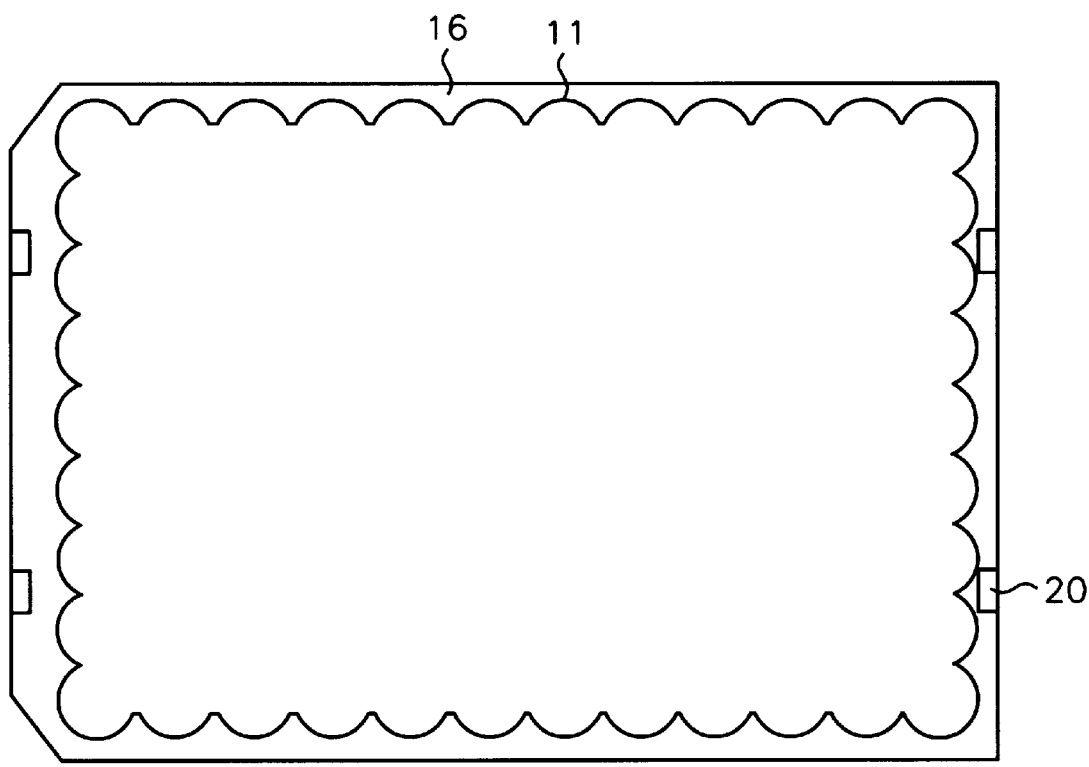
FIG. 7A is a top view of the spacer of the present invention.
Figure 7B:
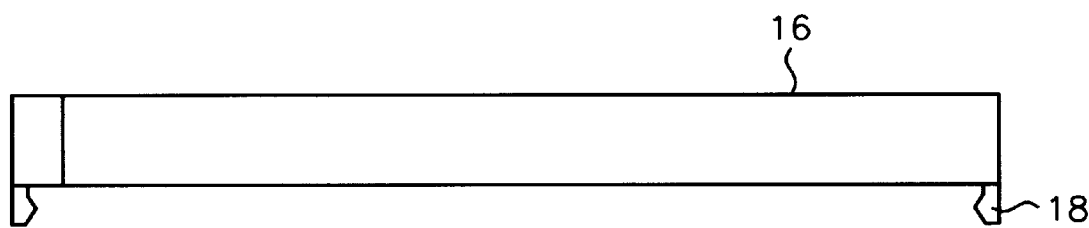
FIG. 7B is a side view of the spacer shown in FIG. 7A.

A preferred embodiment of the base plate 4, as shown in FIGS. 2A, 2B, 2C, and 2D, includes slots 14 in the top of its perimeter 6. These slots 14 are constructed to connect to tabs 18 on either the bottom of spacer 16 or the cover piece 22. These slots 14 allow the base plate 4 to be secured to spacer tabs 18 or cover lugs 24. The spacer 16 contacts the base plate 4 around the perimeter portion 6 of base plate 4 and has tabs 18 on the bottom side of spacer 16 for attachment to the base plate 4 or other spacers 16. In addition, as shown in the top and side views of spacer 16 in FIGS. 7A and 7B, the spacers 16 have slots 20 on their top sides for attachment to tabs 18 from other spacers or, if it is the top spacer which is attached to the cover 22, to cover lugs 24. Any number of spacers 16 may be used to increase the height of the vial plate 2 and to allow vial plate 2 to support vials of different sizes. The spacers 16 may be constructed of the same material, having the same density, as the base plate 4. Thus, a chemically resistant polypropylene plastic or any other suitable material can be used to construct spacers 16.

Figures 3A, 3B:
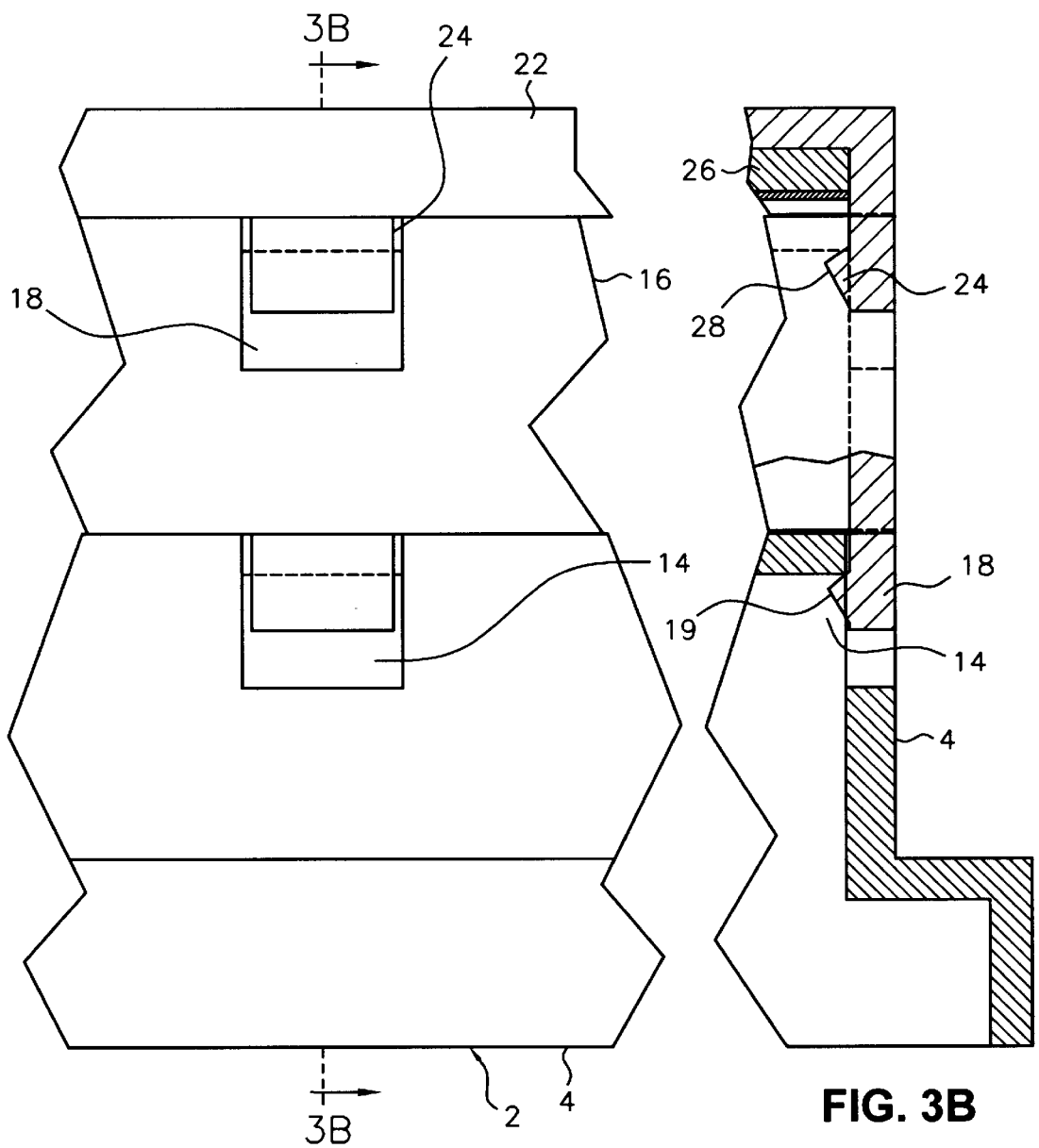
FIG. 3A is an exploded side view of the cover, spacer, and base plate attached using slots and tabs.
FIG. 3B is an exploded side view of the cover, spacer, and base plate attached using slots and tabs through section 3B—3B of FIG. 3A.

FIGS. 3A and 3B depict the spacer 16, base plate 4, and cover 22 attached to each other. The spacer 16 and base plate 4 are attached through the tabs 18 of the spacer snapping into the slots 14 of the base plate 4. The tabs 18 may contain a slanted end 19 which secures them within the slots 14. The spacer 16 is attached to the cover 22 through lugs 24 of the cover 22 snapping into the slots 20 of the spacer 16.

Figure 6A:
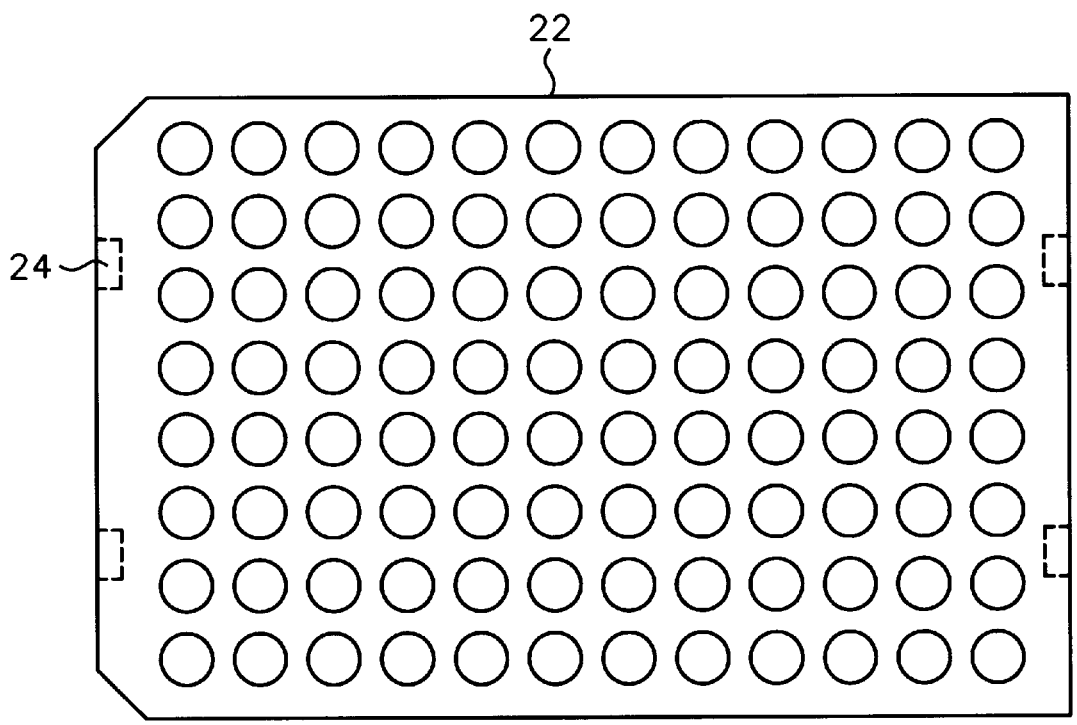
FIG. 6A is a top view of the cover of the present invention.
Figure 6B:
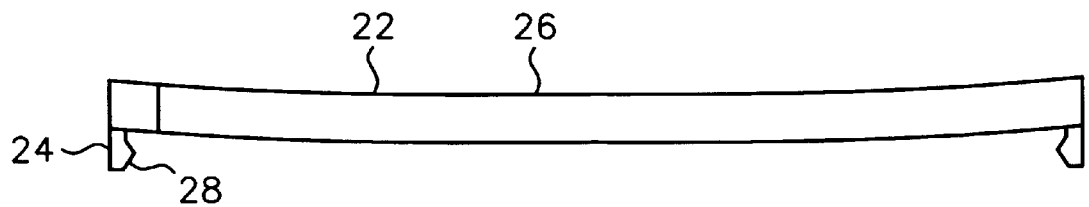
FIG. 6B is a side view of the cover shown in FIG. 6A.

As shown in FIGS. 4A and 4B, the cover 22 may be placed on the top spacer 16 which may be attached to other spacers 16. The bottom spacer 16 is attached to the base plate 4. (If a single spacer 16 is used, then spacer 16 is attached to the base plate 4 and may also be attached to the cover 22.) The spacers 16 are attached to each other through tabs 18 and slots 14 and the cover 22 is attached to the slots 14 through lugs 24. The cover 22 may have a curved shape, shown specifically in FIGS. 6A and 6B. The cover includes a resilient liner 26 within it and is in a top-hat configuration, such as shown and described in U.S. Pat. No. 5,016,771, the contents of which are incorporated herein by reference in their entirety. The liner 26 may be constructed generally of a rubber material such as silicone, natural or butyl rubber, polyisoprene (natural red rubber), or a polytetrafluoroethylene such as Teflon (a trademark of E. I. DuPont de Nemours & Co., Inc. of Wilmington, Del.), or any combination of those materials. The liner 26 insures sealing of the vial plate 2 and enables use of the vial plate 2 with certain volatile solvents. Further, the liner 26 facilitates puncturing with a needle or syringe and resealing the liner 26 such that it will self-repair a hole formed by such a needle or syringe.

Figures 5A, 5B:
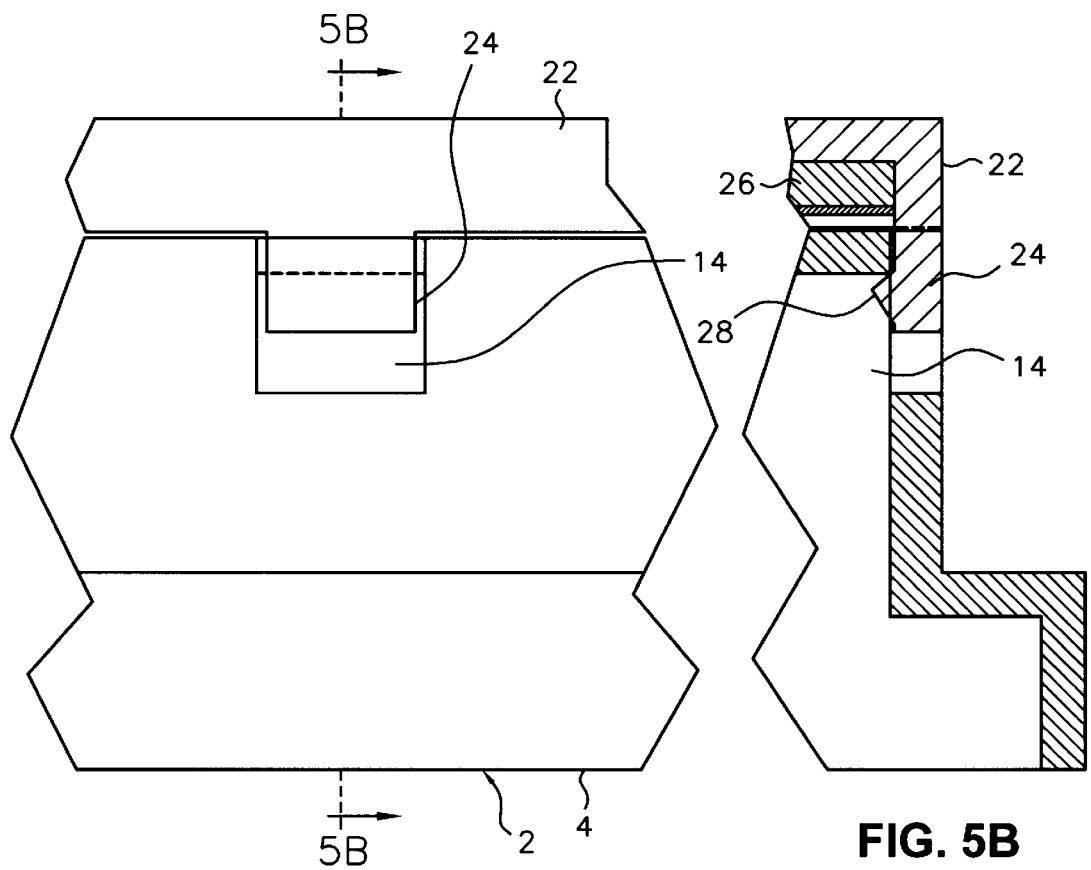
FIG. 5A is an exploded side view of the cover and base plate attached using slots and tabs.
FIG. 5B is an exploded side view of the cover and base plate attached using slots and tabs through section 5B—5B of FIG. 5A.

FIGS. 5A and 5B depict the cover 22 and base plate 4 attached to each other through the lugs 24 of the cover snapping into the slots 14 of the base plate 4. The lugs 24 may contain a slanted end 28 which secures lugs 24 within the slots 14.

The vial plate 2 may hold up to 96 or 384 vials, which are common capacities for vial holders used in analytical chemistry assays. Vial plate 2 can accommodate 9 millimeter (mm) tapered, round or flat-bottom vials of various heights, e.g., 16 mm, 32 mm, or 48 mm. For example, the base plate alone would be used for 16 mm vials, the base plate and one spacer would be used for 32 mm vials, and the base plate and two spacers would be used for 48 mm vials. Thus, the multi-tiered vial plate can support 0.5, 1.0, and 1.5 milliliter (ml) vials or other groups of vials with varying heights. The vials that can be used in the vial plate 2 of the present invention can be made of glass, plastic, or other suitable materials. The vials may have different shapes, including round or flat-bottomed, square-shaped, or tapered.

The vial plate 2 of the present invention may be used with analytical chemistry assays and vials used in assays related to drug metabolism, screening in combinatorial chemistry, high-throughput screening, and in sorbent assays. Further, the vial plate 2 is compatible with autosamplers used in certain assays.

Although the invention is illustrated and described herein, the invention is not intended to be limited to the details shown. Rather, various modifications may be made in the details within the scope and range of equivalents of the claims and without departing from the invention.

What is claimed:

1. An apparatus for holding vials comprising:
   a plastic material having a density greater than the density of water;
   a base plate having a bottom, a perimeter having opposing edges, and a plurality of protrusions extending from the bottom spaced from each other to form compartments for holding vials; and said base plate being formed in a unitary one-piece molded construction; and
   the bottom of the base plate having a plurality of openings in the form of channels inside the perimeter of the base plate allowing the passage of fluids through the bottom of the base plate, wherein there is a channel below every compartment and the channels are continuous from adjacent one edge of the perimeter to adjacent the opposing edge of the perimeter.

2. The apparatus of claim 1 wherein the perimeter portion of the base plate is raised and includes a top having slots.

3. The apparatus of claim 2 further comprising at least one spacer having a top with slots for attachment, a bottom, and tabs on the bottom for attachment to the slots of the base plate, the at least one spacer covering the perimeter of the base plate.

4. The apparatus of claim 3 further comprising a cover having a bottom with lugs on the bottom of the cover for attachment to one of the slots of the base plate and the slots of the at least one spacer, the cover covering the entirety of one of the base plate and spacer.

5. The apparatus of claim 4 wherein the cover is curved and contains a liner made of a rubber material.

6. The apparatus of claim 5 wherein the rubber material is at least one member selected from the group consisting of silicone, natural rubber, butyl rubber, polyisoprene, and polytetrafluoroethylene.

7. The apparatus of claim 1 wherein the channels are parallel in relation to each other.

8. An apparatus for holding vials comprising:
- a base plate having a top, a bottom, a plurality of protrusions extending from the bottom spaced from each other to form compartments for holding vials, and a raised perimeter portion including a top with slots and opposing edges, the protrusions being shaped to minimize contact with the vials to be inserted into the compartments; and said base plate being formed of plastic in a unitary one-piece molded construction;
- the bottom of the base plate having a plurality of openings in the form of channels below every compartment, the channels allowing the passage of fluids through the bottom of the base plate and being disposed both inside the perimeter of the base plate and parallel with each other, wherein the channels are continuous from adjacent one edge of the perimeter to adjacent the opposing edge of the perimeter;
- a first spacer having a top with slots and a bottom with tabs, the tabs of the first spacer engaging the slots on the perimeter portion of the base plate to attach the first spacer to the base;
- a second spacer having a top with slots and a bottom with tabs, the tabs of the second spacer engaging the slots on the top of the first spacer to attach the second spacer to the first spacer; and
- a cover having a bottom with lugs engaging the slots on the top of the second spacer to attach the cover to the second spacer, the cover being curved and containing a liner made of a rubber material of at least one member selected from the group consisting of silicone, natural rubber, butyl rubber, polyisoprene, and polytetrafluoroethylene.

9. The apparatus of claim 1 wherein the protrusions are shaped to minimize contact with the vials to be inserted into the compartments.

10. An apparatus for holding vials comprising:
- a plastic material of construction having a density greater than the density of water;
- a base plate having a bottom, a raised perimeter having opposing edges, and a plurality of protrusions extending from the bottom spaced from each other to form compartments for holding vials, the protrusions being shaped to minimize contact with the vials to be inserted into the compartments, wherein the bottom of the base plate has a plurality of openings in the form of channels inside the perimeter of the base plate and below every compartment, the channels allowing the passage of fluids through the bottom of the base plate, wherein the channels are continuous from one edge of the perimeter to the opposing edge of the perimeter and the ends of the compartments are scalloped where the compartments contact the perimeter of the base plate;
- at least one spacer covering the perimeter of the base plate; and
- a cover covering the entirety of the at least one spacer, the cover containing a liner made of a rubber material of at least one member selected from the group consisting of silicone, natural rubber, butyl rubber, polyisoprene, and polytetrafluoroethylene.

11. The apparatus of claim 10 wherein the liner of the cover facilitates sealing of the vial plate, puncturing with a needle or syringe, and resealing of the liner.

* * * * *